US012697815B2

(12) United States Patent
Otsuka

(10) Patent No.: US 12,697,815 B2
(45) Date of Patent: Aug. 4, 2026

(54) LIQUID DISCHARGE HEAD

(71) Applicant: CANON KABUSHIKI KAISHA, Tokyo (JP)

(72) Inventor: Manabu Otsuka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 59 days.

(21) Appl. No.: 18/643,552

(22) Filed: Apr. 23, 2024

(65) Prior Publication Data

US 2024/0351333 A1 Oct. 24, 2024

(30) Foreign Application Priority Data

Apr. 24, 2023 (JP) ................................ 2023-070692

(51) Int. Cl.
*B41J 2/14* (2006.01)
*B41J 2/16* (2006.01)

(52) U.S. Cl.
CPC ......... *B41J 2/14233* (2013.01); *B41J 2/1623* (2013.01); *B41J 2002/14419* (2013.01)

(58) Field of Classification Search
CPC .................. B41J 2/14233; B41J 2/1623; B41J 2002/14419; B41J 2/1628; B41J 2/1631; B41J 2/1642; B41J 2/1646; B41J 2002/14241; B41J 2202/12; B41J 2/161; B41J 2/14
See application file for complete search history.

(56) References Cited

U.S. PATENT DOCUMENTS

2019/0263116 A1* 8/2019 Ito .......................... B41J 2/1623

FOREIGN PATENT DOCUMENTS

JP 2006-272746 A 10/2006

* cited by examiner

*Primary Examiner* — Lisa Solomon
(74) *Attorney, Agent, or Firm* — Venable LLP

(57) ABSTRACT

A liquid discharge head includes a junction substrate including a first substrate and a second substrate joined with each other by an adhesive. A first surface of the first substrate to be joined with the second substrate is configured to have a plurality of first openings each configured to serve as a liquid passage, a first depressed portion capable of retaining the adhesive, and a second depressed portion configured to have a larger opening area than that of the first depressed portion and to be capable of retaining the adhesive; the first depressed portion is arranged in a region between two adjacent first openings of the plurality of first openings; and the second depressed portion is arranged in a region between the first openings and an outer edge of the first substrate.

14 Claims, 14 Drawing Sheets

LIQUID DISCHARGE HEAD

BACKGROUND OF THE INVENTION

Field of the Invention

The present invention relates to a liquid discharge head.

Description of the Related Art

In recent years, in manufacturing of a MEMS (Micro Electro Mechanical System) such as a pressure sensor or an acceleration sensor, or a functional device such as a microfluidic device, a device has been manufactured, which includes a substrate joint body including substrates joined with each other therein via an adhesive. One example thereof may be a liquid discharge head for discharging a liquid. Examples of the liquid discharge head may include an ink jet recording head.

Such an ink jet recording head has an energy generating element for providing energy for discharging an ink. Further, a discharge port member is formed on the substrate surface, and, in the discharge port member, a plurality of discharge ports for discharging an ink are opened. Further, a through hole as a passage for an ink is formed in the substrate. An ink is supplied from the back surface side toward the front surface side of the substrate through the through hole. The through hole and the discharge port communicate with each other. The ink which has passed through the through hole is discharged from the discharge port by a force applied from the energy generating element. Examples of the energy generating element may be an element capable of boiling an ink by electrical resistance heating such as a heater element, and an element capable of applying a pressure to a liquid using a change in volume such as a piezoelectric element.

Japanese Patent Application Publication No. 2006-272746 also discloses a liquid discharge device as an example of the device including a substrate joint body. Specifically, the head of the liquid discharge device includes a pressure generating chamber communicating with a nozzle opening, and a piezoelectric element including a piezoelectric body layer, and an electrode provided on the piezoelectric body layer. Then, the liquid stored in the pressure generating chamber is emitted through the nozzle opening.

SUMMARY OF THE INVENTION

In the liquid discharge device as in Japanese Patent Application Publication No. 2006-272746, generally, a plurality of substrates are joined using an adhesive. However, for joining the substrates, the adhesive may spread with respect to the structure formed on the substrate surface to be joined. The adhesive that has thus spread may affect the discharge characteristic. For example, when the adhesive spreads in a large amount onto the opening including the energy generating element, such as a piezoelectric element, accommodated therein, driving may be affected thereby. Particularly, when the opening to serve as the ink passage is small, blockage becomes more likely to be caused by the adhesive. This undesirably makes discharge impossible.

In order to deal with such spread of the adhesive, it is conceivable to provide a depressed portion for accommodating the excess adhesive at a site corresponding to the opening pattern. For example, the following countermeasures can be considered: a depressed portion capable of accommodating the adhesive is provided around the opening including the energy generating element accommodated therein, or the opening to serve as the ink passage, so as to block the inflow of the adhesive into the openings. However, only by simply arranging large depressed portions to block the adhesive, it may be impossible to suppress the occurrence of a fault.

The present invention has been made in view of the foregoing problem. It is an object of the present invention to provide a technology of reducing the effect of the spread of the adhesive on the openings provided in the substrate of the liquid discharge head.

The present invention provides a liquid discharge head comprising: a junction substrate including a first substrate and a second substrate joined with each other by an adhesive, wherein

- a first surface of the first substrate to be joined with the second substrate is configured to have a plurality of first openings each configured to serve as a liquid passage, a first depressed portion configured to be capable of retaining the adhesive, and a second depressed portion configured to have a larger opening area than that of the first depressed portion and to be capable of retaining the adhesive,
- in a region between the adjacent two first openings of the plurality of first openings, the first depressed portion is arranged, and
- the second depressed portion is arranged in a region between the first opening and an outer edge of the first substrate.

The present invention can provide a technology of reducing the effect of the spread of the adhesive on the openings provided in the substrate of the liquid discharge head.

Further features of the present invention will become apparent from the following description of exemplary embodiments with reference to the attached drawings.

BRIEF DESCRIPTION OF THE DRAWINGS

FIGS. 9A to 9C are each a schematic view of the region blocked by a step or an opening;

DESCRIPTION OF THE EMBODIMENTS

Below, by reference to the accompanying drawings, preferred embodiments of the present invention will be described explanatorily in detail. However, the dimensions, materials, shapes, and the relative arrangement of the constituent components described in the embodiment are not intended to limit the scope of this invention only thereto unless otherwise specified. Further, the materials, shapes, and the like of the members once described in the following description are the same as those in the initial description also in a later description unless specified again. Particularly, the well-known technology or the known technology in the present technical field is applicable to the configuration and the steps not shown or not described. Further, overlapping description may be omitted.

Further, the present embodiment describes joining of 3 substrates as an example. However, the present matter is not limited thereto, and is applicable to a case where a plurality of substrates are joined.

Embodiment 1

Below, with reference to the accompanying drawings, a description will be given to a substrate for a liquid discharge head in accordance with embodiment 1 of the present invention. Incidentally, in the following embodiment, specific description may be performed for sufficiently describing the present invention. This shows a technically preferable example, and does not particularly limit the scope of the present invention.

A liquid discharge head is a member included in a recording device such as an ink jet printer. The recording device is additionally provided with a liquid accommodation part for accommodating a liquid to be supplied to the liquid discharge head, a transport mechanism of a recording medium for performing recording, and the like.

Figure 1:
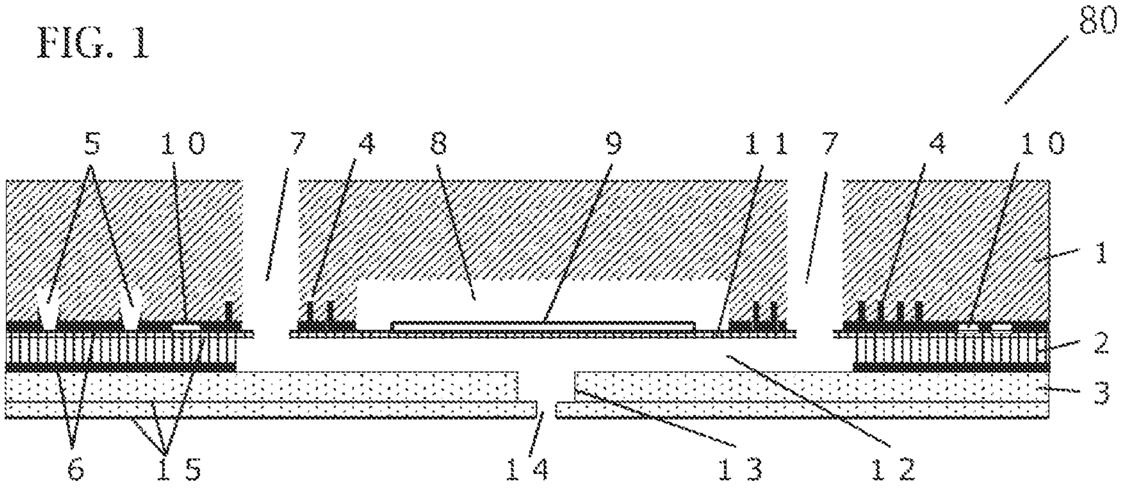
FIG. 1 is a cross sectional schematic view of a joint substrate for a liquid discharge head in accordance with embodiment 1.

FIG. 1 is a cross sectional schematic view of a junction substrate 80 for a liquid discharge head in accordance with embodiment 1 of the present invention. Incidentally, in FIG. 1, the effect of the adhesive to inflow into the opening is not shown.

The liquid discharge head includes a first substrate 1, a second substrate 2, and a third substrate 3. The present embodiment takes the configuration as an example of the first substrate 1 and the second substrate 2. However, the present invention is not limited thereto. Respective substrates are joined by an adhesive 6 to form a substrate for a liquid discharge head. In other words, the junction substrate has at least one junction surface using the adhesive, and has two junction surfaces in the example shown.

The first substrate 1 includes, for example, a silicon substrate, and has a structure in which a piezoelectric element 9 is formed on a vibration film 11. At the second substrate 2, an opening for forming a pressure chamber 12 is formed. The vibration film 11 forms the ceiling wall of the pressure chamber 12, and defines a plurality of pressure chambers 12. Further, at the first substrate 1, a second opening 8, a first opening 7 for introducing a liquid into the pressure chamber 12, and the like are formed.

In the present example, the upper part of the junction substrate 80 is formed by joining the first substrate 1 and the second substrate 2 via the adhesive 6. Herein, at the first substrate 1, the second opening 8 and the first opening 7 are formed, and at the second substrate 2, the pressure chamber 12 is formed. Further, in the second opening 8, a plurality of piezoelectric elements 9 are accommodated in such a manner as to correspond to the plurality of pressure chambers 12, respectively.

The third substrate 3 includes, for example, a silicon substrate, has a liquid discharge passage 13, and has a discharge port 14 for discharging a liquid formed at the bottom surface of the liquid discharge passage 13. The discharge port 14 penetrates through the third substrate 3 together with the liquid discharge passage 13, and has a discharge port on the opposite side to the pressure chamber 12. Therefore, when a change in volume of the pressure chamber 12 is caused, the liquid stored in the pressure chamber 12 passes through the liquid discharge passage 13, and is discharged through the discharge port 14.

At the first substrate 1, first depressed portions 4 and second depressed portions 5 in accordance with the present invention are respectively formed. On the first substrate 1, an ink tank (not shown) is arranged. Then, a first opening 7 is formed in such a manner as to penetrate through the first substrate 1 and the second substrate 2, and to communicate with the pressure chamber 12. Therefore, the liquid in the ink tank is supplied to the pressure chamber 12 through the first opening 7.

On the vibration film 11, the piezoelectric element 9 is arranged. As a result, a piezoelectric actuator is configured. The piezoelectric element 9 includes a lower electrode (not shown) formed on a vibration film forming layer, a piezoelectric element 9 formed on the lower electrode, and an upper electrode (not shown) formed on the piezoelectric element.

The vibration film forming layer is formed by, for example, plasma CVD. Then, a hydrogen barrier film (not shown), the lower electrode (not shown), a piezoelectric body film, and the upper electrode (not shown) are sequentially formed. The lower electrode and the upper electrode are formed by, for example, the sputtering method, and the piezoelectric body film is formed by the sol gel method, and may be formed by the sputtering method.

To the piezoelectric element 9, for example, a PZT (lead zirconate titanate) film formed by the sol gel method or the sputtering method is applicable. Such a piezoelectric element 9 includes a sintered compact of a metal oxide crystal. An interlayer film and a wire 10 are formed so as to enable driving of the actuator part. As a result, an actuator substrate can be formed.

The piezoelectric element 9 is formed at a position opposed to the pressure chamber 12 across the vibration film 11. Namely, the piezoelectric element 9 is formed in such a manner as to be in contact with the surface of the vibration film 11 opposed to the pressure chamber 12. The vibration film 11 has a characteristic of being deformable in the direction opposed to the pressure chamber 12. Then, when a driving voltage propagates through the wire 10 from a driving IC (not shown), and is applied to the piezoelectric element 9, the inverse piezoelectric effect deforms the piezoelectric element 9. As a result of this, the vibration film 11 is deformed together with the piezoelectric element 9. As a result, a change in volume of the pressure chamber 12 is caused, so that the liquid is pressurized. The pressurized liquid passes through the liquid discharge passage 13, and is discharged in a form of a microscopic droplet from the discharge port 14.

Subsequently, the first depressed portion 4 and the second depressed portion 5 in accordance with the present invention will be described in detail. When the second substrate 2 is joined with the first substrate 1 via the adhesive 6, the adhesive may block the first opening 7 as the ink passage formed at the junction surface, or may spread to the second opening 8 including the piezoelectric element 9 accommodated therein for affecting the discharge.

The inventors of the present application found the following. By properly arranging the depressed portions for accommodating the adhesive around the openings, it is possible to effectively suppress the effect of spread of the adhesive.

Around the first opening 7 or the second opening 8 (in the outer circumferential part of the chip), such large depressed portions as to block the inflow of the adhesive into the openings from the wide adhesion region are preferably arranged. FIGS. 2A to 2D are each a schematic view showing the blocking effect of the depressed portion, and show the simulation results of the spread amount of the adhesive into the opening with respect to the clearance of the depressed portion.

Figure 2A:
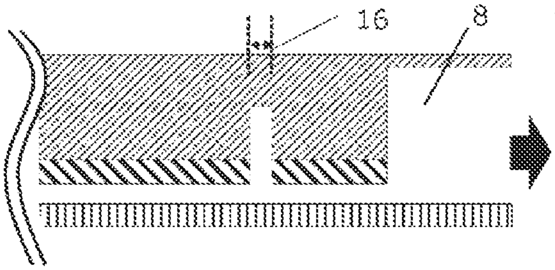
FIGS. 2A to 2D are each a view for studying the relationship between the width of the depressed portion and the spread amount of the adhesive.
Figure 2B:
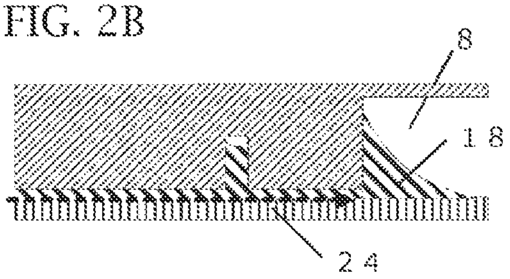

When the width 16 of the depressed portion is small as in FIG. 2A, the adhesive outside the depressed portion with respect to the opening 8 flows into the depressed portion, resulting in filling of the adhesive. Then, as in FIG. 2B, the adhesive that could not be fully accommodated in the depressed portion passes through the depressed portion, so that the adhesive spread 18 at the opening 8 becomes large.

Figure 2C:
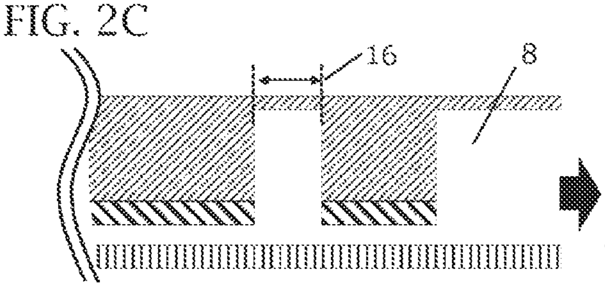
Figure 2D:
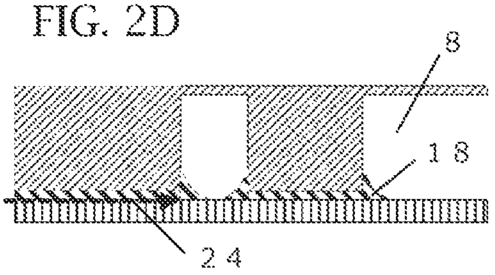

On the other hand, when the width 16 of the depressed portion is large as in FIG. 2C, the accommodation amount increases. This enables sufficient accommodation of the adhesive at the depressed portion. For this reason, as in FIG. 2D, the adhesive outside the depressed portion with respect to the opening 8 is accommodated by the depressed portion, and is blocked from the opening 8. Further, the adhesive in the region between the depressed portion and the opening 8 spreads not only to the side of the opening 8, but also to the side of the depressed portion. For this reason, the spread amount to the side of the opening 8 is reduced. As a result, the adhesive spread 18 at the opening 8 becomes relatively smaller than that in the case of FIG. 2B.

Figure 6:
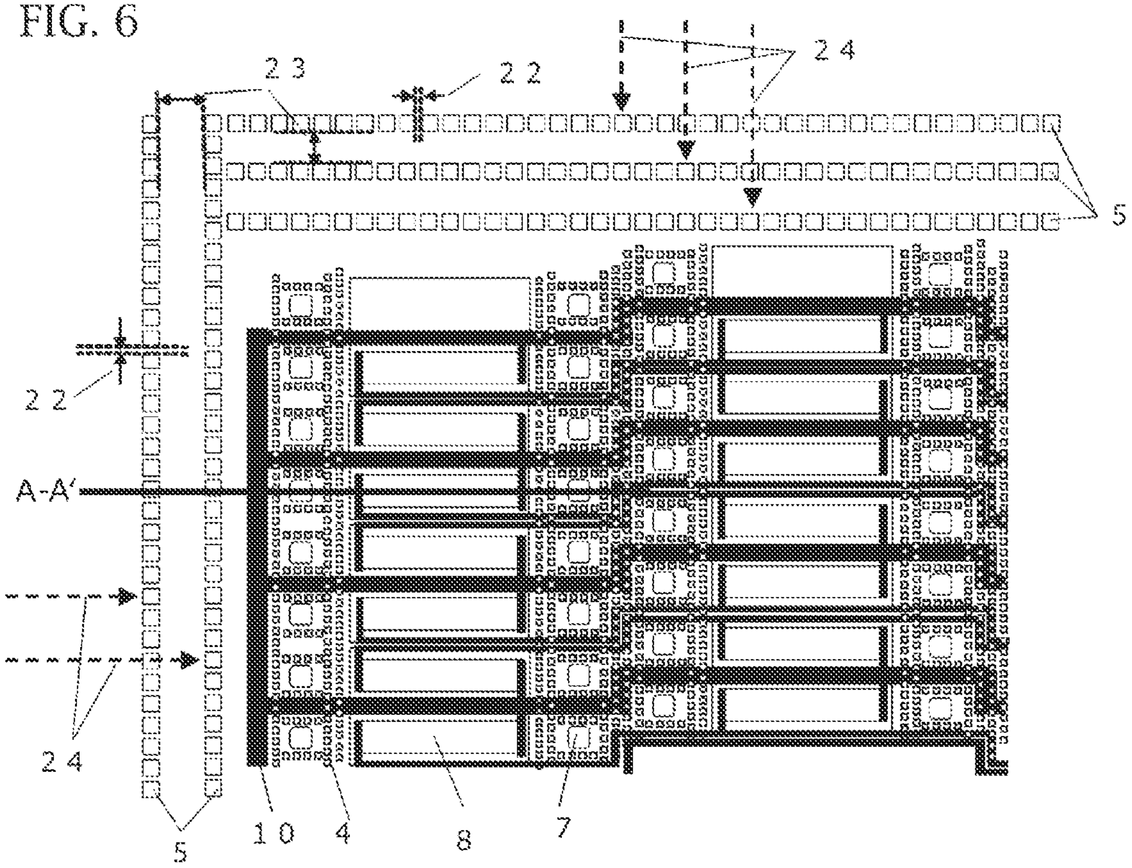
FIG. 6 is a plan schematic view at the substrate junction surface.

Around the first opening 7 or the second opening 8 (in the outer circumferential part of the chip), second depressed portions 5 having the effect of blocking the flow 24 of the adhesive as shown in FIG. 6 are arranged. The second depressed portions 5 are preferably arranged in continuous rows. Although depending upon the area of the adhesion region, a plurality of rows are preferably formed.

Figure 3A:
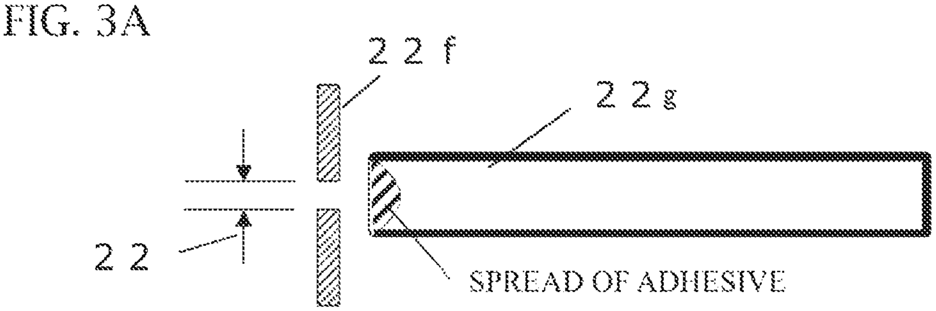
FIGS. 3A and 3B are each a view showing the simulation results of the width of the depressed portion and the spread amount of the adhesive.
Figure 3B:
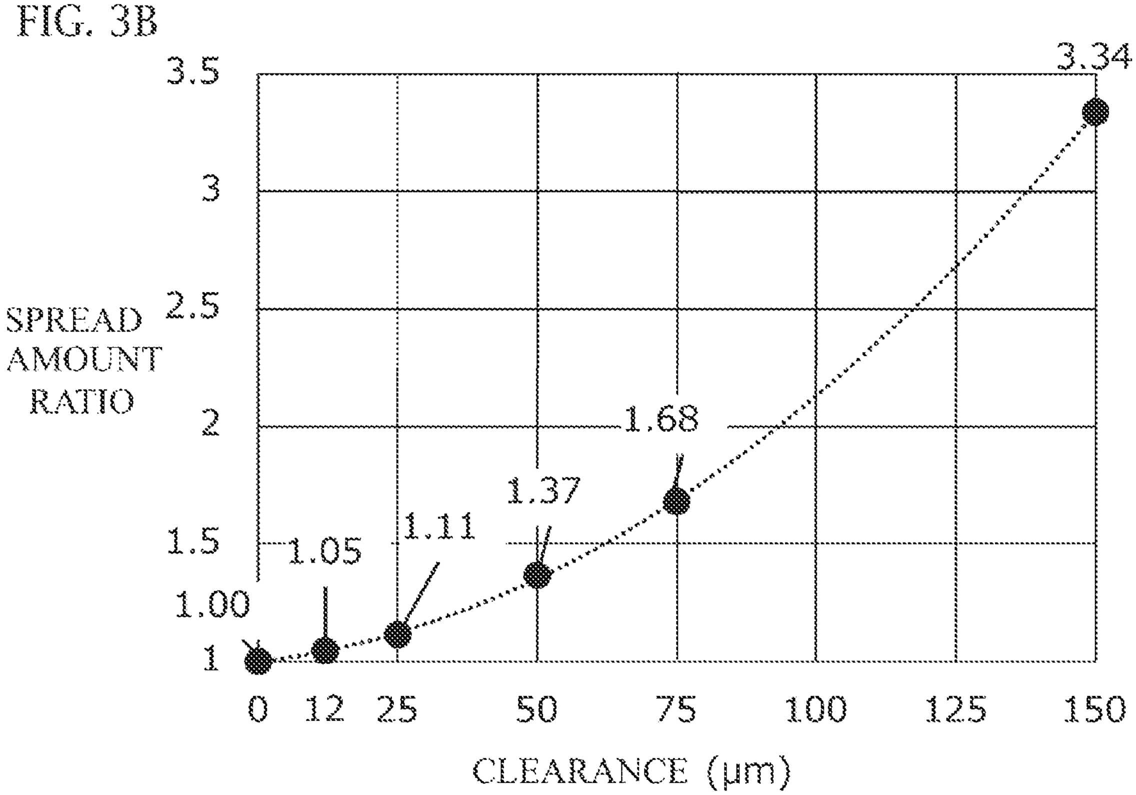

In order to enhance the blocking effect of the adhesive, a depressed portion **22*f* is provided with respect to a mimic opening 22*g* as in FIG. 3A. The relationship of the spread amount ratio of the adhesive to the opening (vertical axis) to the clearance 22 between the depressed portions (horizontal axis) in this case is simulated. The results are shown in FIG. 3B. The graph of FIG. 3B indicates that the clearance 22 between the second depressed portions 5** in the continuously arranged rows is preferably 25 μm or less, and is further more preferably 12 μm or less.

When the second depressed portions 5 are formed in continuous rows as shown in FIG. 6, the distance between rows 23 of the clearance between the rows of the second depressed portions 5 preferably has a large "adhesion margin" in order to ensure the joint reliability. For example, the distance between rows 23 is preferably set as being equal to or larger than one width of the second depressed portion 5 in the direction of arrangement of the rows of the second depressed portions 5 (i.e., being equal to or larger than the width of the second depressed portion 5 in the direction perpendicular to the direction of extension of the rows of the second depressed portions 5). More preferably, the "adhesion margin" for two widths of the second depressed portion 5 or larger is desirably ensured. FIG. 6 shows a specific example of the positional relationship between the clearance 22 between the second depressed portions 5 and the distance between rows 23.

In view of the accommodation of the adhesive, the size of the opening shape of the second depressed portion 5 is preferably 30 μm or more per side when the opening shape is a polygon. Incidentally, the opening shape of the second depressed portion 5 is not limited to a polygon. Also in that case, there is preferably a distance of 30 μm or more at at least any position of the wall surfaces of the depressed portion. Further, the second depressed portion 5 being not filled with the adhesive leaves a margin for accommodation capacity, and is preferable. Incidentally, such small depressed portions as to tend to cause the capillarity are arranged around the first opening 7 like the ink passage. This can bring back the adhesive that has once spread back to the depressed portion.

Figure 4A:
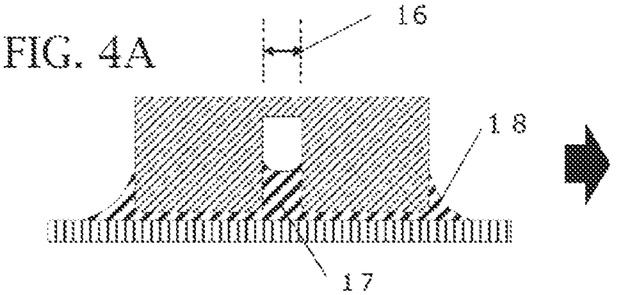
FIGS. 4A to 4D are each a view showing the simulation results of the behavior of the adhesive with respect to the width of the depressed portion.
Figure 4B:
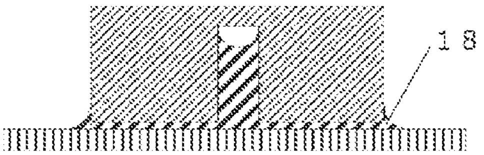
Figure 4C:
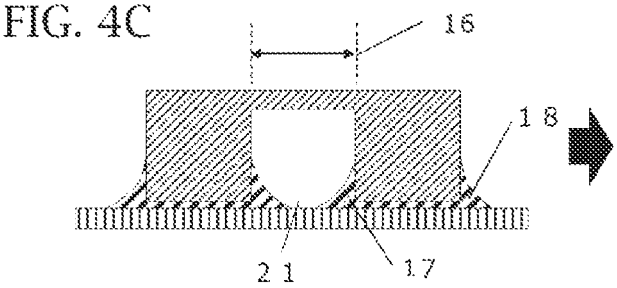
Figure 4D:
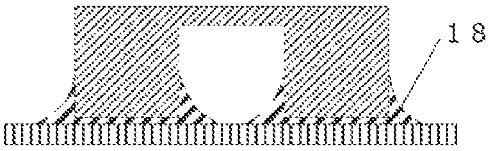

FIGS. 4A to 4D each show the simulation results of the behavior of the adhesive with respect to the width 16 of the depressed portion. FIGS. 4A and 4B show the results when the width 16 of the depressed portion is small, and FIGS. 4C and 4D show the results when the width 16 of the depressed portion is large. FIGS. 4A and 4C each show the state of from adhesion to the initial stage, and FIGS. 4B and 4D each show a schematic view after an elapse of a sufficient time from adhesion. In FIG. 4A, at the junction surface of the depressed portion, the adhesive 17 becomes continuous, and hence the capillarity is caused. After an elapse of a sufficient time, the adhesive is drawn into the depressed portion, resulting in the reduction of the adhesive spread 18 as in FIG. 4B.

On the other hand, in FIG. 4C, there is a site 21 at which the adhesive is not continuous at the junction surface of the depressed portion. In this case, as in FIG. 4D, a force of the meniscus is balanced and stabilized between the spread 17 of the adhesive at the junction surface of the depressed portion and the spread 18 of the adhesive with respect to the opening. Accordingly, drawing by the capillarity is less likely to be caused. As a result, the amount of the adhesive spread 18 on the side of the opening increases. Accordingly, the first depressed portions 4 causing capillarity as in FIG. 4A are arranged around the first opening 7 as the ink passage.

Herein, in FIG. 4C, the capillarity does not act, however, there is an advantage that the accommodation amount of the adhesive increases because of the large width. For this reason, the case of FIG. 4C can be preferably used as the second depressed portion 5 of the present invention.

On the other hand, preferably, the first depressed portion 4 is a smaller opening than the second depressed portion 5, and the adhesive at the junction surface is continuous for exhibiting the effect of the capillarity. Namely, the first depressed portion 4 is preferably set as such a small depressed portion as to make the adhesive continuous, and is specifically, preferably set at about 15 μm or less per side.

Figure 5A:
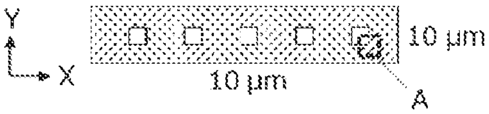
FIGS. 5A to 5F show the planar shape of the depressed portion and the simulation results of the drawn adhesive.
Figure 5D:
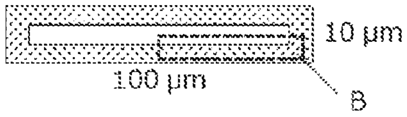
Figure 5B:
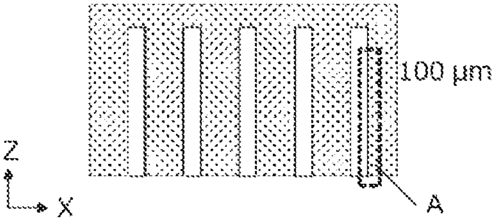
Figure 5E:
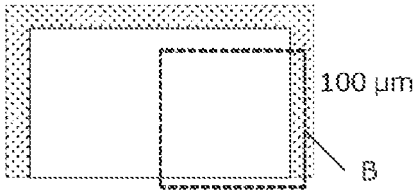
Figure 5F:
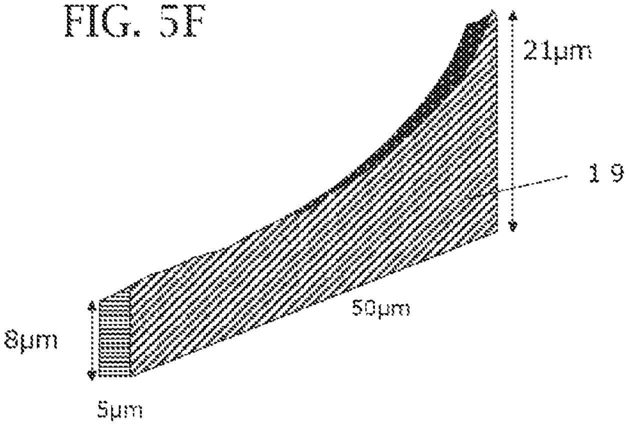
Figure 5C:
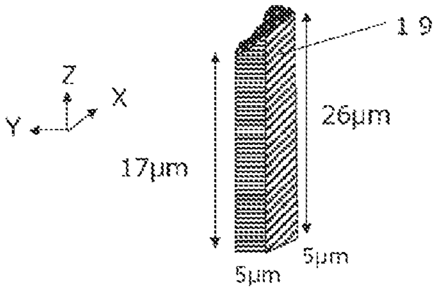

Further, FIGS. 5A to 5F show the results obtained by quantifying the volume of the adhesive 19 drawn into the depressed portion when the planar shape of the depressed portion was changed by simulation. FIGS. 5A to 5C are each the case where the planar shape of the depressed portion is a 10×10 μm square, and FIGS. 5D to 5F are each the case where the planar shape of the depressed portion is a 10×100 μm rectangle.

FIGS. 5A and 5D show a plane X-Y. Herein, as shown in FIGS. 5B and 5E, the depressed portions with a height of 100 μm are compared. FIG. 5C is a schematic view showing the shape of the adhesive 19 drawn into the region (the region of a broken line A) of ¼ of the depressed portion shown in FIGS. 5A and 5B with X-Y-Z axes. FIG. 5F is a schematic view showing the shape of the adhesive 19 drawn into the region (the region of a broken line B) of ¼ of the depressed portion shown in FIGS. 5D and 5E with X-Y-Z axes.

Table 1 shows the calculation results of the volume of the adhesive 19 drawn into the depressed portion with the simulation of FIGS. 5A to 5F.

TABLE 1

| | X length of depressed portion (μm) | Y length of depressed portion (μm) | Area of X-Y plane ($\mu m^2$) | Volume of drawn adhesive ($\mu m^3$) | Volume of adhesive to be drawn at the same area (※1000 $\mu m^3$) |
|---|---|---|---|---|---|
| (a)-(c) | 10 | 10 | 100 | 1793 | 17930 |
| (d)-(f) | 100 | 10 | 1000 | 7792 | 7792 |

ink passage may block the passage of the ink when the spread of the adhesive occurs even in a small amount. For this reason, a large number of the first depressed portions 4 capable of drawing a large amount of the adhesive at the same area are provided. Further, the interval between the first openings 7 is narrow. For this reason, as the depressed portion to be arranged between the adjacent two first openings 7, a relatively smaller first depressed portion 4 is preferable. However, when a large number of relatively smaller first depressed portions 4 are formed, a large number of gaps between the depressed portions that can be the paths for the adhesive are also formed. Thus, the adhesive may reach the passage for the ink. Under such circumstances, as shown in FIG. 6, a second depressed portion 5 that is relatively larger, and is capable of accommodating a large volume of adhesive is arranged in the region between the first opening 7 and the outer edge of the substrate. As a result, the amount of the adhesive that would originally go toward the first depressed portion 4 is reduced. As a result, the number of the first depressed portions 4 can also be reduced. For this reason, the number of such gaps as to serve as the paths for the adhesive can also be reduced. In this manner, in the present embodiment, by arranging proper depressed portions according to the positional relationship with the openings and the position in the entire substrate, it is possible to effectively accommodate the adhesive in the depressed portions.

As shown in Table 1, in the case where the corner parts of the depressed portion are set so as to facilitate the transmission of the adhesive 19 as in FIGS. 5A and 5D, when the sides of the depressed portion are short, and the opening shape is close to a regular polygon (e.g., a square) as in FIG. 5A, the amount of the adhesive to be drawn per area of the same plane is larger. For this reason, for the planar shape of the depressed portion, a smaller difference between the shortest side and the longest side is more preferable. For example, for the first depressed portion 4, the ratio of the lengths of the shortest side and the longest side is preferably 1: less than 1.5, and more preferably 1: less than 1.1. Namely, RS<1.5 is preferable, and RS<1.1 is more preferable where SS represents the short side of the first depressed portion, SL represents the long side thereof, and RS=SS/SL represents the ratio of the lengths of the sides of the depressed portion. In the present embodiment, the case where the opening shape is a tetragon is taken as an example. However, even a polygon other than a tetragon can provide the effects.

From the description up to this point, the opening area per one depressed portion of the first depressed portion 4 is preferably smaller from the viewpoint of drawing of the capillarity. Further, the opening area of the second depressed portion 5 is preferably larger for blocking the adhesive from the viewpoint of the accommodation amount of the adhesive. Namely, in the present invention, the opening area is preferably larger at the second depressed portion 5 than at the first depressed portion 4.

Figure 7A:
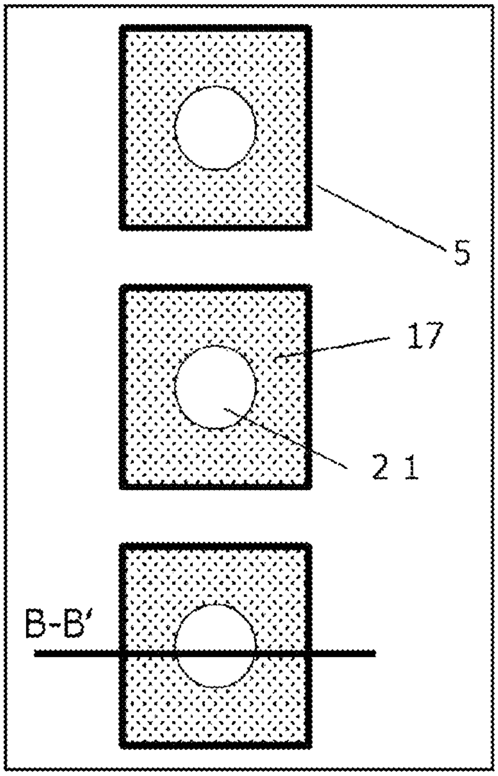
FIGS. 7A and 7B are a plan schematic view and a cross sectional schematic view of a second depressed portion at the substrate junction surface, respectively.
Figure 7B:
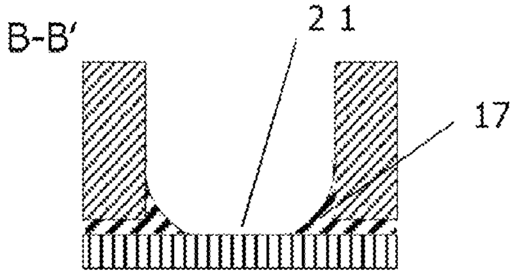
Figure 8A:
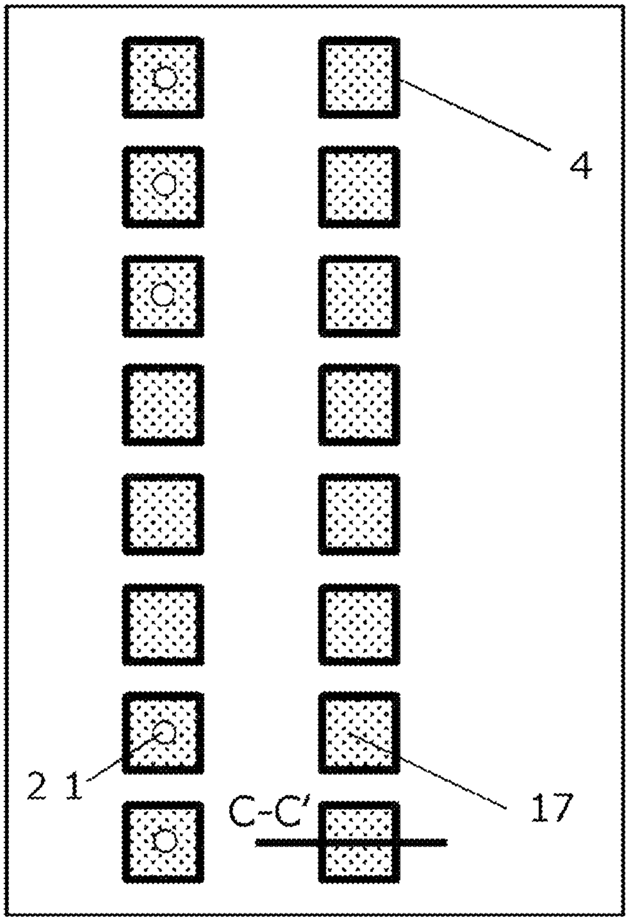
FIGS. 8A and 8B are a plan schematic view and a cross sectional schematic view of a first depressed portion at the substrate junction surface, respectively.
Figure 8B:
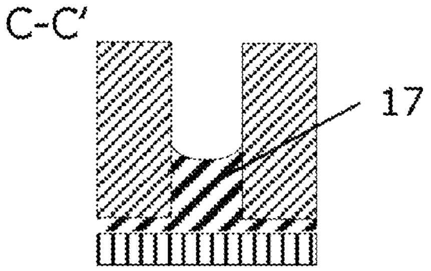

FIG. 6 shows a plan schematic view of the junction surface between the first substrate 1 and the second substrate 2 in accordance with the present invention. Against the adhesive approaching the first openings 7 and the second openings 8 from therearound, the flow 24 of the adhesive is blocked at the second depressed portions 5, and the first depressed portions 4 causing strong drawing due to the capillarity are arranged around the first opening 7 serving as the ink passage. Namely, the first opening 7 serving as the FIGS. 7A and 7B show a plan schematic view (FIG. 7A), and a cross sectional schematic view at the B-B' cross section (FIG. 7B) of the state in which the adhesive at the junction surface of the second depressed portion 5 is formed, respectively. FIGS. 8A and 8B show a plan schematic view (FIG. 8A), and a cross sectional schematic view at the C-C' cross section (FIG. 8B) of the state in which the adhesive at the junction surface of the first depressed portion 4 is formed, respectively.

As shown in FIGS. 7A and 7B, at the second depressed portion 5, there is a site 21 at which the adhesive is not continuous at the junction surface (a site not filled), indicating that there is still room for the accommodation capacity. On the other hand, as shown in FIGS. 8A and 8B, at the first depressed portion 4, the adhesive 17 at the junction surface is continuous, resulting in a state in which the drawing effect due to the capillarity is exhibited. Incidentally, with the first depressed portion 4, the adhesive 17 at the junction surfaces of all the first depressed portions 4 may not necessarily be continuous according to the arrangement and the amount of the adhesive. It is essential only that the adhesive 17 at the junction surfaces is continuous at at least some first depressed portions 4.

As shown in FIGS. 7A and 7B, the second depressed portion 5 of the present embodiment is shown as a shape close to a square. However, the second depressed portion 5 is not limited to the example shown so long as it is in a shape with a sufficiently large width. The ratio of the long side and the short side also has no particular restriction, and a shape like a rectangle is also acceptable. Even a shape of a polygon can provide the effects.

Herein, setting of the number of the first depressed portions 4 per unit area (e.g., 100 $\mu m^2$) larger than that of the second depressed portions 5 results in an increase in number of the depressed portions allowing the capillarity to act, which preferably leads to a relative increase in amount of the adhesive to be drawn.

Further, FIG. 1 is a cross sectional view of a junction substrate formed up to a nozzle in an A-A' cross section of FIG. 6. Herein, for example, the simultaneous formation of the first depressed portion 4 and the second depressed portion 5 by dry etching is preferable because the depth of the second depressed portion 5 is formed deeper than the depth of the first depressed portion 4, and the accommodation amount of the adhesive at the outer circumference of the chip increases. In this case, at the first depressed portion 4, the accommodation amount becomes smaller than at the second depressed portion 5. However, also in that case, in the periphery of the first opening 7 to serve as the ink passage, and at least at the place in the inside of the chip requiring the suppression of the spread of the adhesive, the number of the first depressed portions 4 per unit area (e.g., 100 $\mu m^2$) is desirably set larger than that of the second depressed portions 5. As a result of this, it becomes possible to increase the accommodation amount of the adhesive into the first depressed portions 4.

The embodiment to which the present invention is applied has no particular restriction. However, in an aspect in which a plurality of first openings 7 to serve as the ink passages are arranged with respect to the pressure chamber 12 (e.g., an aspect in which an ink circulates) as shown in FIGS. 1 and 6, the first openings 7 are arranged in a high density, and hence the aspect is more preferable. In such an aspect, the first openings 7 are arranged on both sides of the second opening 8 to serve as a piezoelectric element accommodation part. For this reason, the first depressed portion 4 arranged in the periphery of the first opening 7 can also resultantly bring a high effect on the suppression of the adhesive spread of the second opening 8.

Figure 9A:
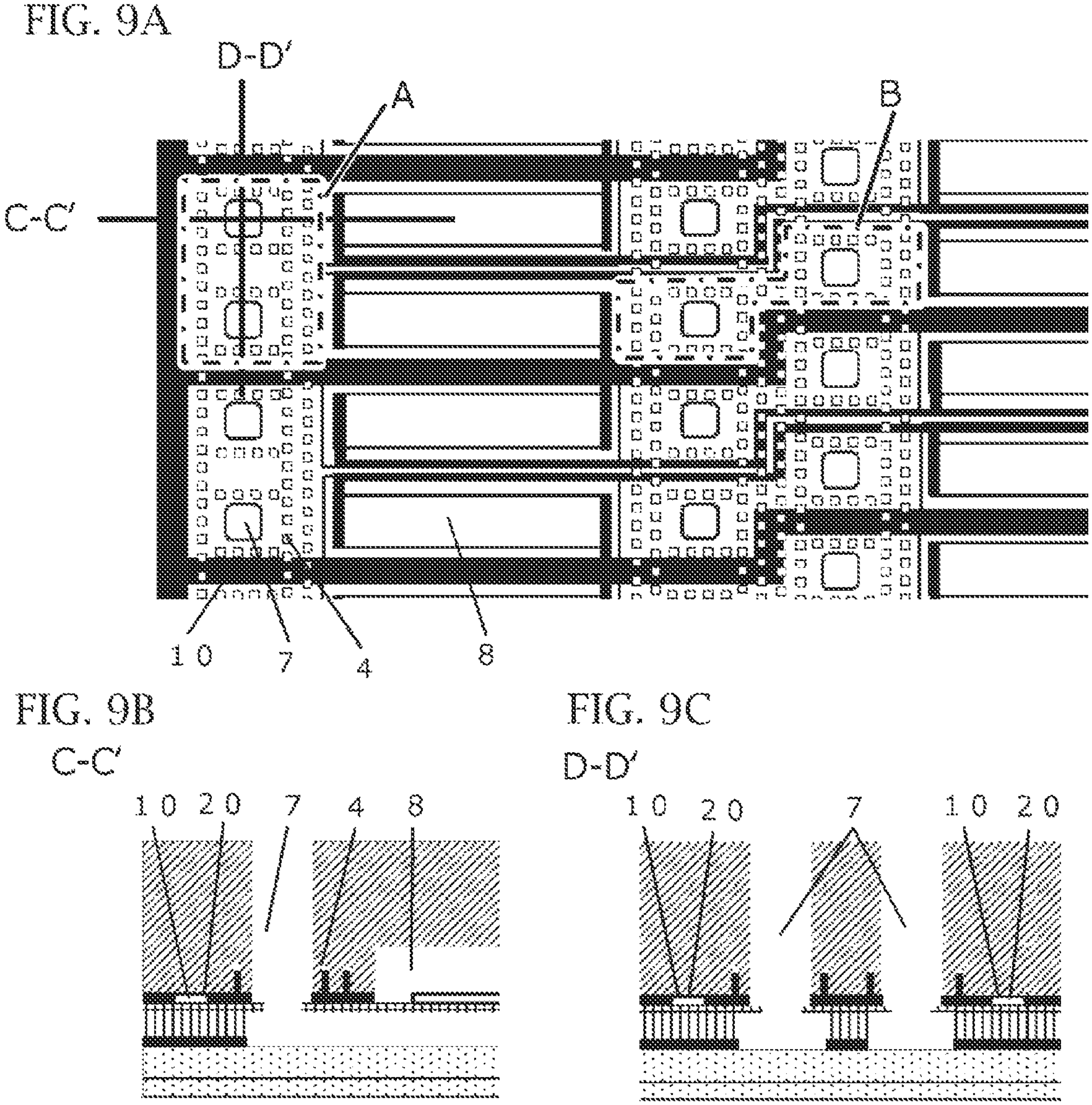

Further, in the region surrounded by the step like the wire 10, and the second openings 8 (e.g., a broken line A and a broken line B of FIG. 9A), the first depressed portions 4 and the first openings 7 are arranged in the region as shown in FIG. 9A. As a result, it is possible to effectively suppress the adhesive spread at the first openings 7.

A specific description will be given by taking FIG. 9A as an example. As indicated with a C-C' cross section of FIG. 9B, and a D-D' cross section of FIG. 9C, the thickness of the adhesive 20 on the wire 10 at the junction surface is reduced, resulting in an increase in flow resistance of the adhesive. This can suppress the inflow of the adhesive from the outside. Further, the opening like the second opening 8 restricts the path for the adhesive. Namely, the case is assumed where the first opening 7 and the first depressed portions 4 are arranged in the region surrounded by the step like the wires 10 and the second openings 8 as with the region of A and the region of B in FIG. 9A. In this case, the adhesive present in the region of A and the region of B enters the first depressed portions 4 by the capillarity, and the step like the wire 10 and the second openings 8 reduce the inflow of the adhesive into the region of A and the region of B from the outside. For this reason, the spread of the first opening 7 is definitely drawn by the capillarity of the first depressed portion 4. As a result, it becomes possible to effectively suppress the spread of the first opening 7.

FIGS. 10A and 10B to FIGS. 12A and 12B show one example of a method for manufacturing a substrate in accordance with the present invention regarding the A-A' cross section of FIG. 6. The processing of the substrates has no particular restriction, and can be carried out by a general substrate processing process.

For example, a silicon substrate can be used for a semiconductor manufacturing process. The processing becomes possible by forming a desirable etching mask on the surface of a substrate, and then carrying out Si dry etching. The etching mask can be formed by, for example, using a novolak type photoresist, and performing exposure and development for patterning. For Si dry etching, for example, an etching method referred to as a so-called Bosch process in which a $SF_6$ gas is used for an etching step, and a $C_4F_8$ gas is used for a coating step can also be used. Further, if required, thinning processing of the substrate or the like can be carried out.

Figure 10A:
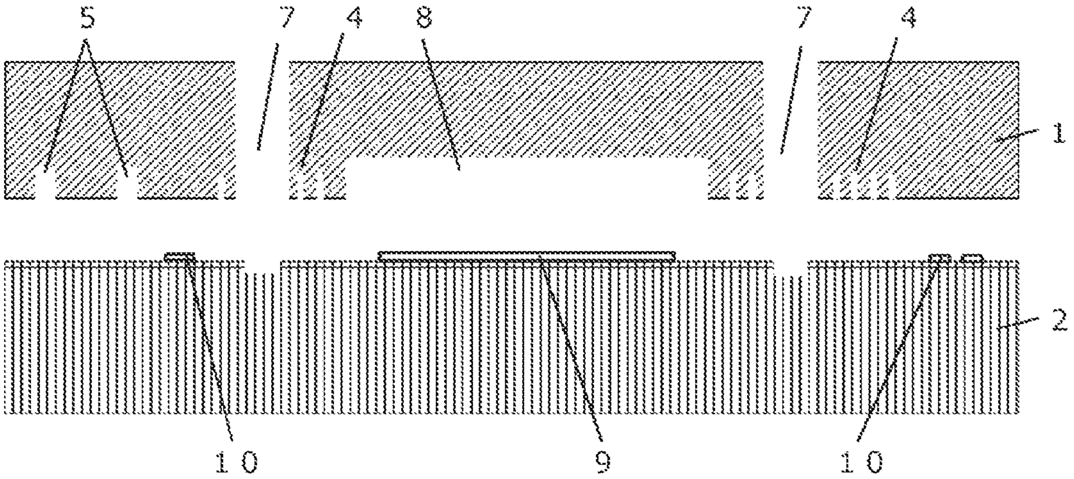
FIGS. 10A and 10B are each a cross sectional view showing one example of the manufacturing method of embodiment 1.

As in FIG. 10A, the first opening 7, the second opening 8, the first depressed portion 4, and the second depressed portion 5 are formed with respect to the first substrate 1. The openings and the depressed portions may be formed at the same time, or may be formed separately.

Figure 10B:
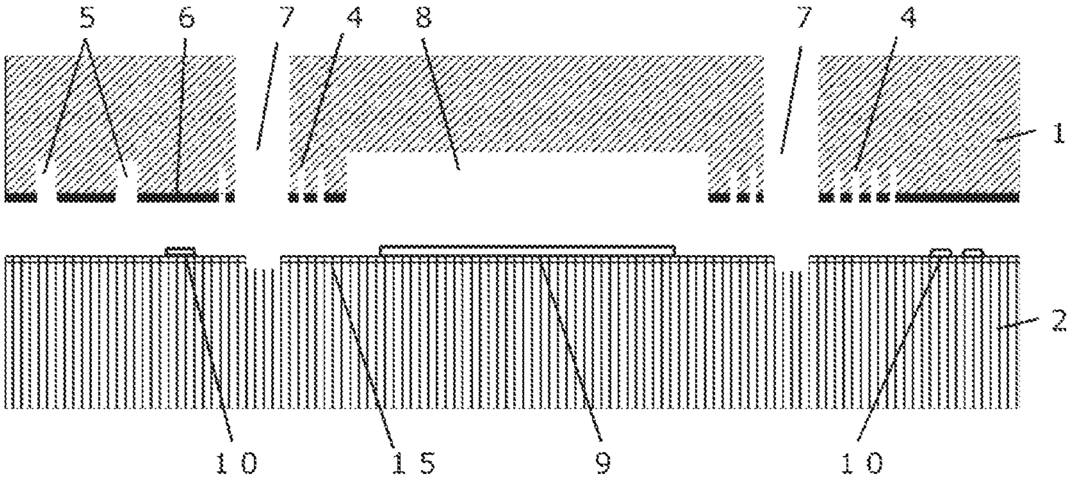

As in FIG. 10B, the adhesive 6 is formed by transfer with respect to the first substrate 1. The adhesive 6 is not transferred to the first depressed portion 4 and the second depressed portion 5 on the transfer surface as in FIG. 10B.

Figure 11A:
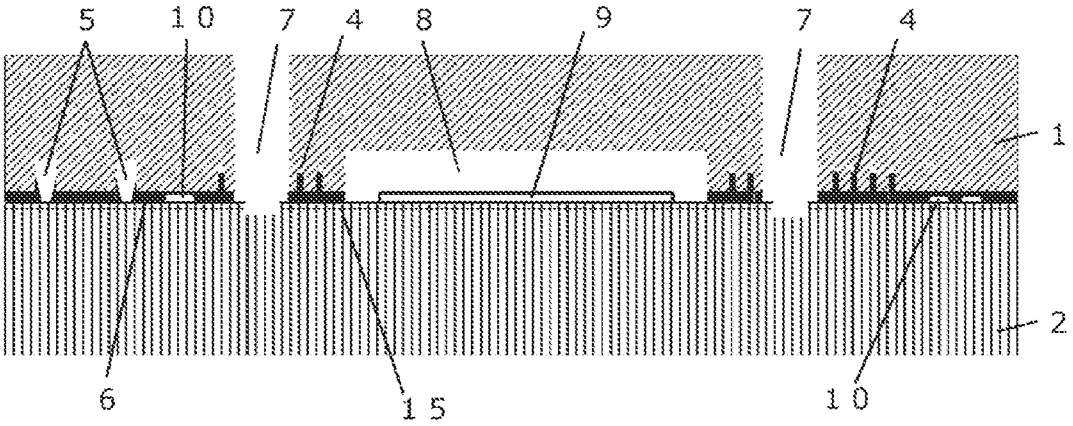
FIGS. 11A to 11C are sequential cross sectional schematic views showing one example of the manufacturing method of embodiment 1.

FIG. 11A is a cross sectional schematic view when the first substrate 1 and the second substrate 2 including the piezoelectric element 9 and the wire 10 formed thereon are joined with each other. At this step, the adhesive 6 enters the first depressed portion 4 and the second depressed portions 5 in accordance with the present invention. This can reduce the adhesive spread amount into the openings.

Figure 11B:
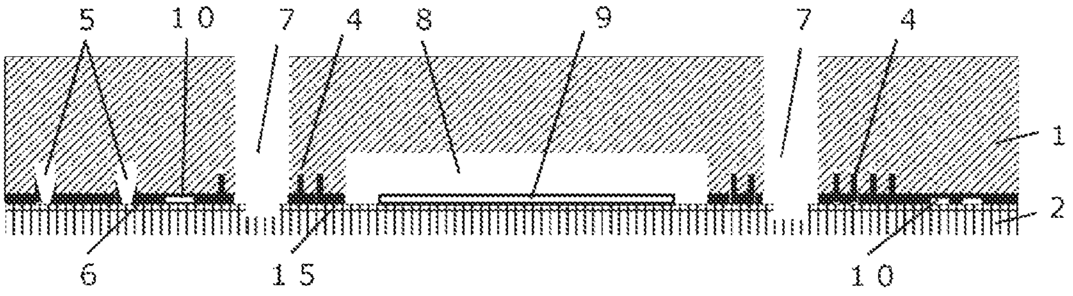
Figure 11C:
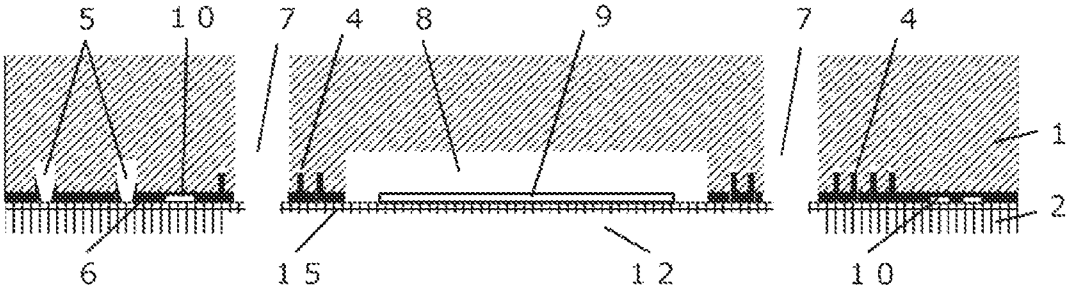

As in FIG. 11B, the second substrate 2 is thinned. Subsequently, as in FIG. 11C, the pressure chamber 12 is formed at a position corresponding to the piezoelectric element 9. In the present invention, the step of forming the pressure chamber 12 after joining and thinning the second substrate 2 is taken as an example. However, not limited thereto, the pressure chamber 12 may be formed after joining the thinned second substrate 2, or the second substrate 2 formed up to the pressure chamber 12 may be joined.

Figure 12A:
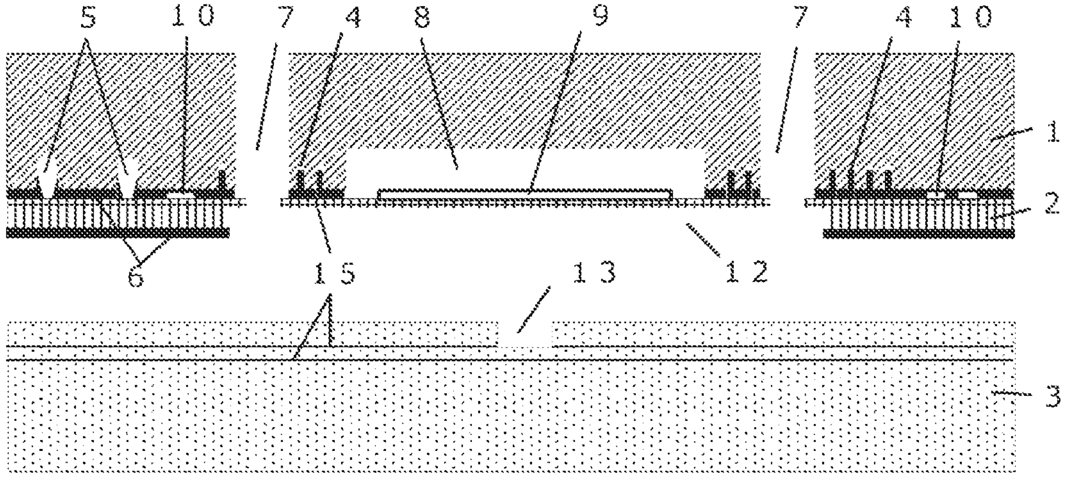
FIGS. 12A and 12B are sequential cross sectional schematic views showing one example of the manufacturing method of embodiment 1.
Figure 12B:
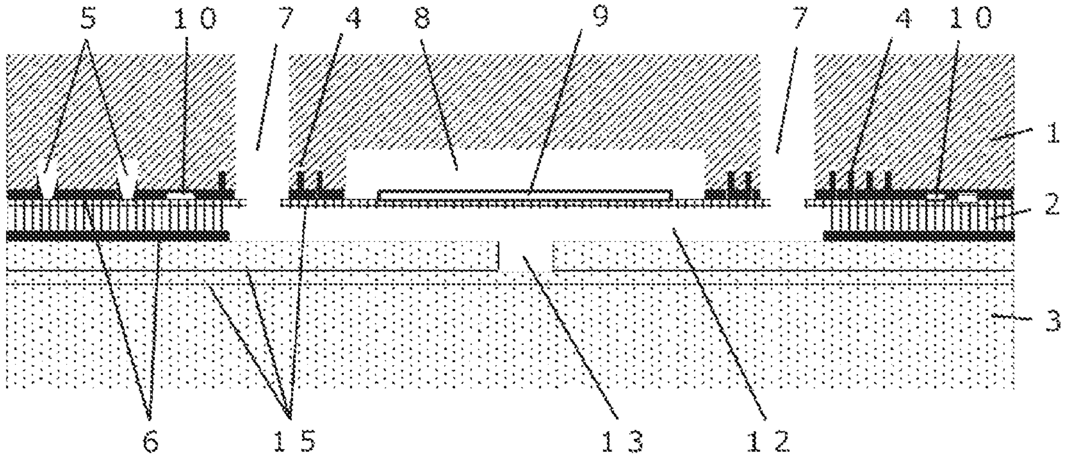

As in FIG. 12A, the adhesive 6 is transferred to the second substrate 2. In the present embodiment, the depressed portion for accommodating the excess adhesive at the second substrate 2 is not shown, but may be formed, if required. The liquid discharge passage 13, and the like are formed on the junction surface of the third substrate 3, if required. Then, as in FIG. 12B, the second substrate 2 and the third substrate 3 are joined with each other.

Figure 13A:
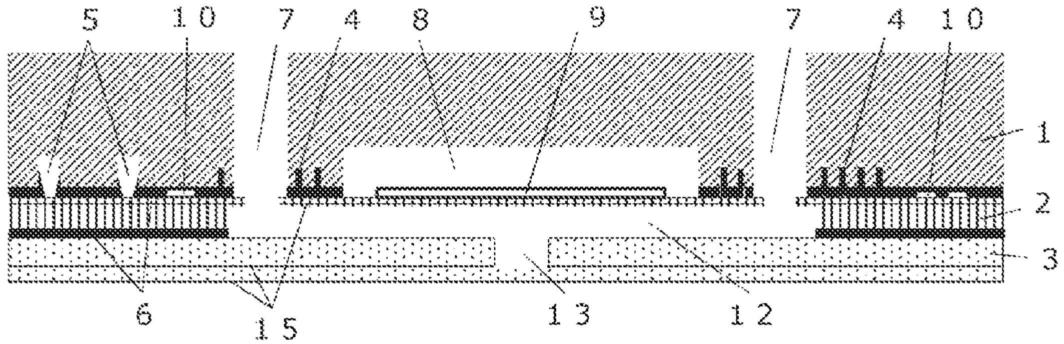
FIGS. 13A and 13B are sequential cross sectional schematic views showing one example of the manufacturing method of embodiment 1.
Figure 13B:
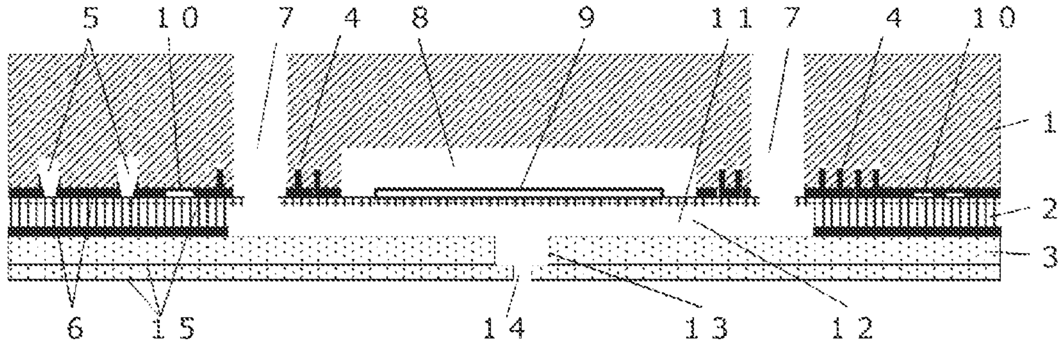

As in FIG. 13A, thinning of the third substrate 3 is carried out, and as in FIG. 13B, the discharge port 14 is formed. In the present invention, the step of joining and thinning the third substrate 3, and forming the discharge port 14 is taken as an example. However, the present invention is not limited thereto, and the discharge port 14 may be formed after joining the thinned third substrate 3, or the second substrate 2 formed up to the discharge port 14 may be joined. Further, each substrate may be provided with an oxide film 15 that can be an etching stop layer. The oxide films 15 may be removed, if required.

As the adhesive 6, a material with high adhesiveness with respect to the substrate is preferably used. Further, a material including less bubbles or the like mixed therein, and having high coatability is preferable. Further, a material that facilitates the reduction of the thickness of the adhesive, and has a low viscosity is preferable. The adhesive preferably includes any resin selected from the group consisting of an epoxy resin, an acrylic resin, a silicone resin, a benzocyclobutene resin, a polyamide resin, a polyimide resin, and a urethane resin.

As the curing method of the adhesive 6, mention may be made of a thermosetting method, and an ultraviolet delayed curing method. Incidentally, when any of the substrates is ultraviolet transmissive, the ultraviolet curing method is also usable. The adhesive coating method is carried out in the following manner. An adhesive is spin coated on a dry film, and is transferred to any one junction surface of the substrate. However, the adhesive coating method is not limited thereto, and screen print is also acceptable. For a photosensitive adhesive, the adhesive coating method may be carried out by photolithography patterning.

In the present invention, benzocyclobutene of a thermosetting resin can be preferably used. The viscosity changes according to the temperature, and hence control thereof is easy. There is the region that would have a viscosity of about 10 to 100 Poise at the time of from joining to curing. For this reason, the capillarity of the first depressed portion 4 effectively acts, and the adhesive becomes more likely to flow into the second depressed portion 5.

The adhesive is preferably formed with a large thickness for eliminating voids at the time of joining. The film thickness before joining is 1.0 μm or more, and preferably 2.0 μm or more. Although an increase in thickness of the adhesive can suppress the voids, spread becomes more likely to be caused with respect to the openings of respective junction surfaces.

Applied Example

Figure 14:
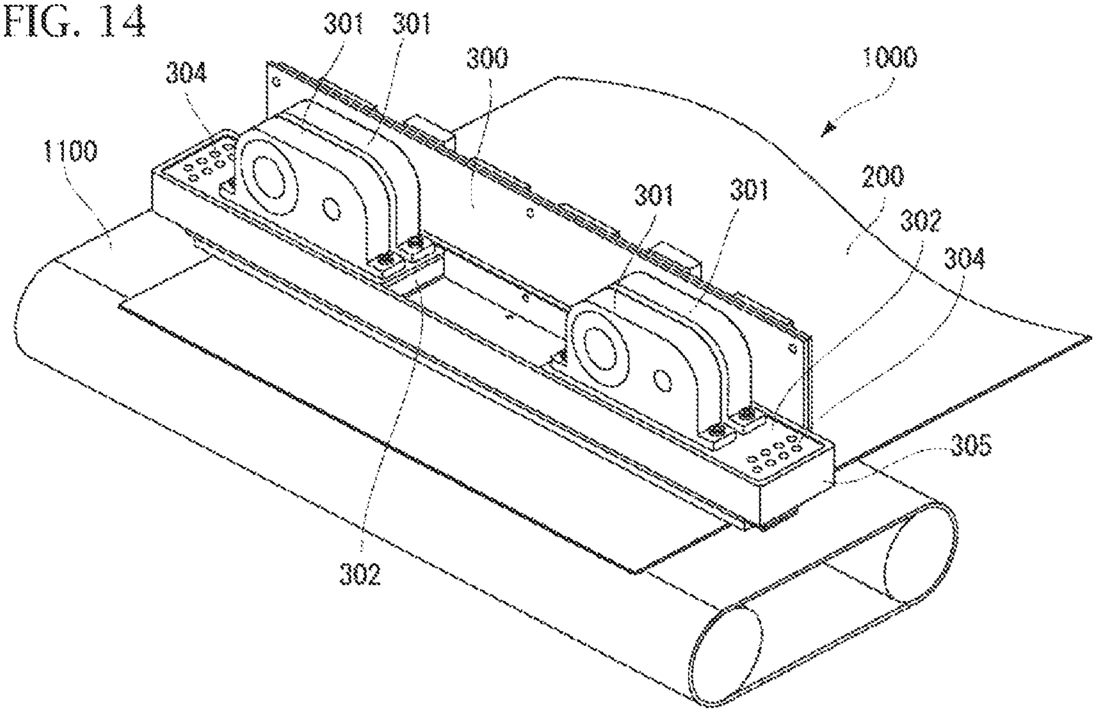
FIG. 14 is a schematic view of a recording device to which the substrate of the present invention is applicable.

Applied Example of the junction substrate in accordance with the embodiment will be described. FIG. 14 shows an example of a liquid discharge device including a liquid discharge head that can use the substrate manufactured as described above. Herein, an ink jet recording device (which will be also hereinafter referred to as a recording device) 1000 using an ink as a liquid, discharging the ink, and performing recording will be described. The recording device 1000 is a line type recording device including a transport part 1100 for transporting a recording medium 200, and a line type liquid discharge head 300 arranged roughly orthogonal to the transport direction of the recording medium 200. The recording device 1000 performs recording while transporting a plurality of recording media 200.

The liquid discharge head 300 includes a negative pressure control unit 301 for controlling the pressure (negative pressure) in the circulation path, a liquid supply unit 302 in fluid communication with the negative pressure control unit 301, liquid connection parts 304 serving as supply and discharge ports of a liquid to the liquid supply unit 302, and a housing 305. The liquid discharge head 300 is capable of full color recording by inks of cyan C, magenta M, yellow Y, and black K, and is fluidly connected with a liquid supply means of a supply passage for supplying the ink to the liquid discharge head 300, a main tank, and a buffer tank. Further, the liquid discharge head 300 is electrically connected with an electric control part for transmitting an electric power and a discharge control signal to the liquid discharge head 300.

Effects

Conventionally, when an adhesive spreads in a large amount into the region in which an energy generating element such as a piezoelectric element is accommodated at the time of manufacturing a liquid discharge head, driving might be affected thereby. Particularly, when the opening to serve as an ink passage is small, the adhesive makes blockage more likely to be caused, undesirably resulting in the occurrence of a fault such as discharge becoming unable to be achieved. For this reason, generally, a countermeasure of providing a large depressed portion capable of accommodating the adhesive around the opening to serve as the ink passage has been carried out. However, only the arrangement of the large depressed portion might not be able to suppress the occurrence of the fault.

Under such circumstances, in the present invention, a junction substrate 80 configuring a liquid discharge head is manufactured with the method described up to this point. With the manufacturing method of the present invention, when the substrates having openings to serve as ink passages, and openings for accommodating a piezoelectric element therein are bonded with each other via an adhesive, the depressed portions having a blocking effect of the adhesive and the depressed portions having the drawing effect of the capillarity were properly arranged. As a result, it becomes possible to reduce the adhesive spread effect on the openings including an energy generating element accommodated therein, and the openings to serve as the ink passages. This can provide a stable liquid discharge head.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-070692, filed on Apr. 24, 2023, which is hereby incorporated by reference herein in its entirety.

What is claimed is:

1. A liquid discharge head comprising:

a junction substrate including a first substrate and a second substrate joined with each other by an adhesive, wherein a first surface of the first substrate to be joined with the second substrate is configured to have a plurality of first openings each configured to serve as a liquid passage, a first depressed portion configured to be capable of retaining the adhesive, and a second depressed portion configured to have a larger opening area than that of the first depressed portion and to be capable of retaining the adhesive, the first depressed portion is arranged in a region between two adjacent first openings of the plurality of first openings, and the second depressed portion is arranged in a region between the first openings and an outer edge of the first substrate.

2. The liquid discharge head according to claim 1, wherein a piezoelectric element is formed at a surface of the second substrate to be joined with the first substrate, at the first surface of the first substrate, a second opening is formed at a position corresponding to the piezoelectric element of the second substrate, and at the first surface, the second depressed portion is formed around a region including the first opening, the first depressed portion, and the second opening.

3. The liquid discharge head according to claim 1, wherein at the first surface of the first substrate, a plurality of second depressed portions are arranged in rows, and the plurality of rows are continuously arranged in a direction crossing the row direction, and a clearance between the plurality of rows in the crossing direction is larger than a clearance in the row direction between the second depressed portions included in the rows.

4. The liquid discharge head according to claim 3, wherein the clearance between the plurality of rows in the crossing direction is larger than a width of the second depressed portion in the crossing direction.

5. The liquid discharge head according to claim 3, wherein the clearance in the row direction between the second depressed portions included in the row is 25 μm or less.

6. The liquid discharge head according to claim 5, wherein the clearance in the row direction between the second depressed portions included in the row is 12 μm or less.

7. The liquid discharge head according to claim 1, wherein an opening shape of the first depressed portion at the first surface of the first substrate is configured to be a polygon of 15 μm or less per side.

8. The liquid discharge head according to claim 7, wherein

RS<1.5 is satisfied where SL represents the longest side of the polygon forming the opening shape of the first depressed portion, and SS represents the shortest side thereof, and RS=SS/SL represents a ratio of lengths.

9. The liquid discharge head according to claim 8, wherein the ratio of the lengths RS<1.1 is satisfied.

10. The liquid discharge head according to claim 1, wherein an opening shape of the second depressed portion at the first surface of the first substrate is configured to be a polygon of 30 μm or more per side.

11. The liquid discharge head according to claim 1, wherein a depth of the second depressed portion is configured to be deeper than a depth of the first depressed portion.

12. The liquid discharge head according to claim 1, wherein plural first depressed portions and second depressed portions are provided, and a number of the depressed portions per unit area of the first depressed portions is greater than that of the second depressed portions.

13. The liquid discharge head according to claim 1, wherein at the junction substrate after joining of the first substrate and the second substrate, at at least part of the plurality of first depressed portions, the adhesive is continuous at a junction surface.

14. A liquid discharge head comprising:

a junction substrate including a first substrate and a second substrate joined with each other by an adhesive, wherein a first surface of the first substrate to be joined with the second substrate is configured to have a plurality first openings each configured to serve as a passage of a liquid, a first depressed portion arranged in a region between two adjacent first openings of the plurality of the first openings, and a second depressed portion configured to have a larger opening area than that of the first depressed portion and arranged in a region between the first openings and an outer edge of the first substrate, and the first depressed portion is configured to accommodate the adhesive by drawing the adhesive by capillarity, and the second depressed portion is configured to have a larger accommodation amount of the adhesive than that of the first depressed portion.

* * * * *